(12) United States Patent
Shin et al.

(10) Patent No.: US 12,338,844 B2
(45) Date of Patent: Jun. 24, 2025

(54) PISTON POSITION DETECTION DEVICE

(71) Applicant: ASIANA IDT INC., Seoul (KR)

(72) Inventors: Sang Do Shin, Seoul (KR); Hoon Suk Lee, Seoul (KR)

(73) Assignee: ASIANA IDT INC., Seoul (KR)

( * ) Notice: Subject to any disclaimer, the term of this patent is extended or adjusted under 35 U.S.C. 154(b) by 0 days.

(21) Appl. No.: 18/570,880

(22) PCT Filed: May 11, 2022

(86) PCT No.: PCT/KR2022/006717
§ 371 (c)(1),
(2) Date: Dec. 15, 2023

(87) PCT Pub. No.: WO2022/265229
PCT Pub. Date: Dec. 22, 2022

(65) Prior Publication Data
US 2024/0133400 A1    Apr. 25, 2024
US 2024/0229833 A9    Jul. 11, 2024

(30) Foreign Application Priority Data

Jun. 15, 2021 (KR) .................. 10-2021-0077520

(51) Int. Cl.
*F15B 15/28*      (2006.01)
(52) U.S. Cl.
CPC ................ *F15B 15/2861* (2013.01)
(58) Field of Classification Search
CPC ............................................. F15B 15/2861
See application file for complete search history.

(56) References Cited

U.S. PATENT DOCUMENTS

| 7,589,523 B2 | 9/2009 | Baak et al. | |
|---|---|---|---|
| 2005/0040815 A1* | 2/2005 | Jagiella | F15B 15/2861 324/207.15 |
| 2014/0084905 A1* | 3/2014 | Shestakov | G01R 33/072 324/207.13 |

(Continued)

FOREIGN PATENT DOCUMENTS

| DE | 102005029224 A1 * | 2/2006 | ......... F15B 15/2861 |
|---|---|---|---|
| DE | 102014010601 A1 * | 1/2016 | ......... F15B 15/2861 |

(Continued)

OTHER PUBLICATIONS

DE102005029224A1_t machine translation thereof (Year: 2006).*

(Continued)

*Primary Examiner* — Matthew Wiblin
(74) *Attorney, Agent, or Firm* — Knobbe, Martens, Olson & Bear, LLP

(57) ABSTRACT

The present invention provides a device for detecting the position of a piston, which includes a magnetic substance and is arranged so as to be movable inside a cylinder, the piston position detection device comprising: a first sensor for detecting the position of the piston by sensing a magnetic field generated by the magnetic substance; a second sensor for preventing false detection of the first sensor by sensing, before the first sensor, an external magnetic field; and a housing, which is mounted on the outer circumferential surface of the cylinder and accommodates the first sensor and the second sensor therein.

10 Claims, 4 Drawing Sheets

(56) References Cited

U.S. PATENT DOCUMENTS

| | | | | |
|---|---|---|---|---|
| 2016/0377452 | A1* | 12/2016 | Heineck | G01D 5/12 324/207.11 |
| 2022/0170973 | A1* | 6/2022 | Prams | G01D 3/036 |
| 2022/0373001 | A1* | 11/2022 | Uchiyama | G01D 5/145 |

FOREIGN PATENT DOCUMENTS

| | | |
|---|---|---|
| JP | H05-312502 A | 11/1993 |
| JP | H07-016103 U | 3/1995 |
| JP | 2021-071116 A | 5/2021 |
| KR | 10-2014-0068787 A | 6/2014 |
| KR | 10-2351525 B1 | 1/2022 |

OTHER PUBLICATIONS

DE102014010601A1_t machine translation thereof (Year: 2016).*
International Search Report dated Aug. 23, 2022 in International Application No. PCT/KR2022/006717.

* cited by examiner

PISTON POSITION DETECTION DEVICE

TECHNICAL FIELD

The present invention relates to a piston position detection device, and more specifically, to a piston position detection device capable of avoiding a false detection due to an external magnetic field through an algorithm (software) method instead of a physical structure change.

BACKGROUND ART

Various actuators are applied to devices used in processes of machining and assembling metal products in the automobile industry and the like.

An actuator includes a cylinder and a piston, and a position of a piston which moves in a cylinder should be necessarily detected to control the operation of the actuator. A magnetic material is installed on the piston to detect the position of the piston, and a method of detecting a position of a piston using a sensor that externally detects a magnetic field generated by the magnetic material is used.

However, since the sensor responds to not only a magnetic field generated by the magnetic material, but also an external magnetic field generated by an electric welding machine used in a process of machining and assembling metal products, there is a problem of falsely detecting the position of the piston. In addition, since a signal is received from the malfunction sensor, a programmable logic controller (PLC) for controlling factory equipment is abnormally operated.

As the conventional external magnetic field blocking method, there is a magnetic field blocking method using a metal material with high permeability. Such a magnetic field blocking method is to prevent a false detection of a magnetic sensor by directly blocking an external magnetic field or guiding a flow of a magnetic field in a direction which is not a direction in which there is a detection position of the magnetic sensor.

However, since a blocking metal for blocking the external magnetic field has magnetic protecting performance proportional to its thickness, a physical structure is large and complicated, and thus there are problems of difficulties in miniaturizing a sensor and securing productivity for mass production.

In addition, a material with high permeability should be formed of an alloy rather than a single metal and used, such an alloy is difficult to form a small blocking structure, a mechanical structure for protecting a sensor is not easy, and a raw material is expensive, and thus there is a problem that a manufacturing cost increases when final products are mass-produced.

In addition, since the blocking metal blocks not only the external magnetic field but also a wireless signal, a sensing signal detected by the sensor cannot be transmitted wirelessly to the outside. Accordingly, since the sensing signal should be transmitted through cables in a wired manner and the cable should be provided, it is difficult to easily handle the complicated process machine when the machine has a problem, and also there is a risk of fire.

DISCLOSURE

Technical Tasks

The present invention is directed to providing a piston position detection device capable of avoiding a false detection due to an external magnetic field through an algorithm (software) method instead of a physical structure change.

In addition, the present invention is directed to providing a piston position detection device which is miniaturized to improve a degree of design freedom and of which a manufacturing cost is reduced.

Meanwhile, other objectives of the present invention not described above may be further considered as within the range easily inferred from the detailed following descriptions and effects.

Technical Solution

One aspect of the present invention provides a piston position detection device which includes a magnetic material and detects a position of a piston disposed to move in a cylinder, the piston position detection device including a first sensor which detects a magnetic field generated by the magnetic material to detect a position of a piston, a second sensor which detects an external magnetic field to prevent a false detection of the first sensor before the first sensor detects the external magnetic field, and a housing which is mounted on an outer circumferential surface of the cylinder and accommodates the first sensor and the second sensor therein.

The second sensor may include an upper sensor which detects the external magnetic field formed at an upper side of the housing before the first sensor detects the external magnetic field and a side sensor which detects the external magnetic field formed at a left or right side of the housing before the first sensor detects the external magnetic field.

The first sensor may be disposed on a lower surface of the housing facing the outer circumferential surface of the cylinder.

The upper sensor may be disposed on an upper surface of the housing, and the side sensor may be disposed on one side surface of the housing.

The first sensor and the second sensor may be positioned on the same surface.

The first sensor and the second sensor may be formed on one substrate, and the substrate may be bent and disposed on an inner surface of the housing.

The first sensor and the second sensor may be disposed to be biased to one side of the housing with reference to a center of the housing.

The piston position detection device may further include a control unit which ignores a sensing signal of the first sensor generated by reacting to the external magnetic field when at least one sensor of the second sensor detects the external magnetic field before the first sensor detects the external magnetic field.

When the at least one sensor of the second sensor detects the external magnetic field, and the sensing signal of the first sensor is input to the control unit within a reference time, the control unit may ignore the sensing signal.

The piston position detection device may further include a communication unit which is provided in the housing and wirelessly transmits the position of the piston detected by the first sensor.

The piston position detection device may further include a battery which supplies power to the first sensor and the second sensor.

Advantageous Effects

According to the present invention, since a false detection due to an external magnetic field can be avoided through an algorithm (software) method instead of a physical structure change, a piston position detection device can be miniaturized to improve a degree of design freedom, and a manufacturing cost can be reduced.

In addition, according to the present invention, since a sensor is disposed to be biased to one side, when a length of a cylinder is relatively small, a piston position detection device can easily detect a position of a piston even when the piston position detection device is not miniaturized.

Meanwhile, it is to be added that, even if the effect is not explicitly mentioned herein, the effect described in the following specification and the potential effect expected by the technical features of the present invention are treated as if described in the specification of the present invention.

MODES OF THE INVENTION

Hereinafter, structures of the present invention provided by various embodiments of the present invention and effects derived from the structures will be described with reference to the accompanying drawings. In description of the present invention, when it is determined that detailed description of related well-known functions which are clear to those skilled in the art may unnecessarily obscure the gist of the present invention, such detailed descriptions will be omitted.

Although terms such as "first," "second," and the like may be used for describing various components, the components are not limited by these terms. These terms are only used to distinguish one component from another component. For example, a first component may be named a second component, and similarly, a second component may also be named a first component without departing from the scope of the present invention. In addition, the singular forms include the plural forms unless the context clearly indicates otherwise. Terms used in embodiments of the present invention may be interpreted as having meanings generally known to those skilled in the art unless so defined here.

Hereinafter, structures of the present invention provided by various embodiments of the present invention and effects derived from the structures will be described with reference to the accompanying drawings.

Figure 1:
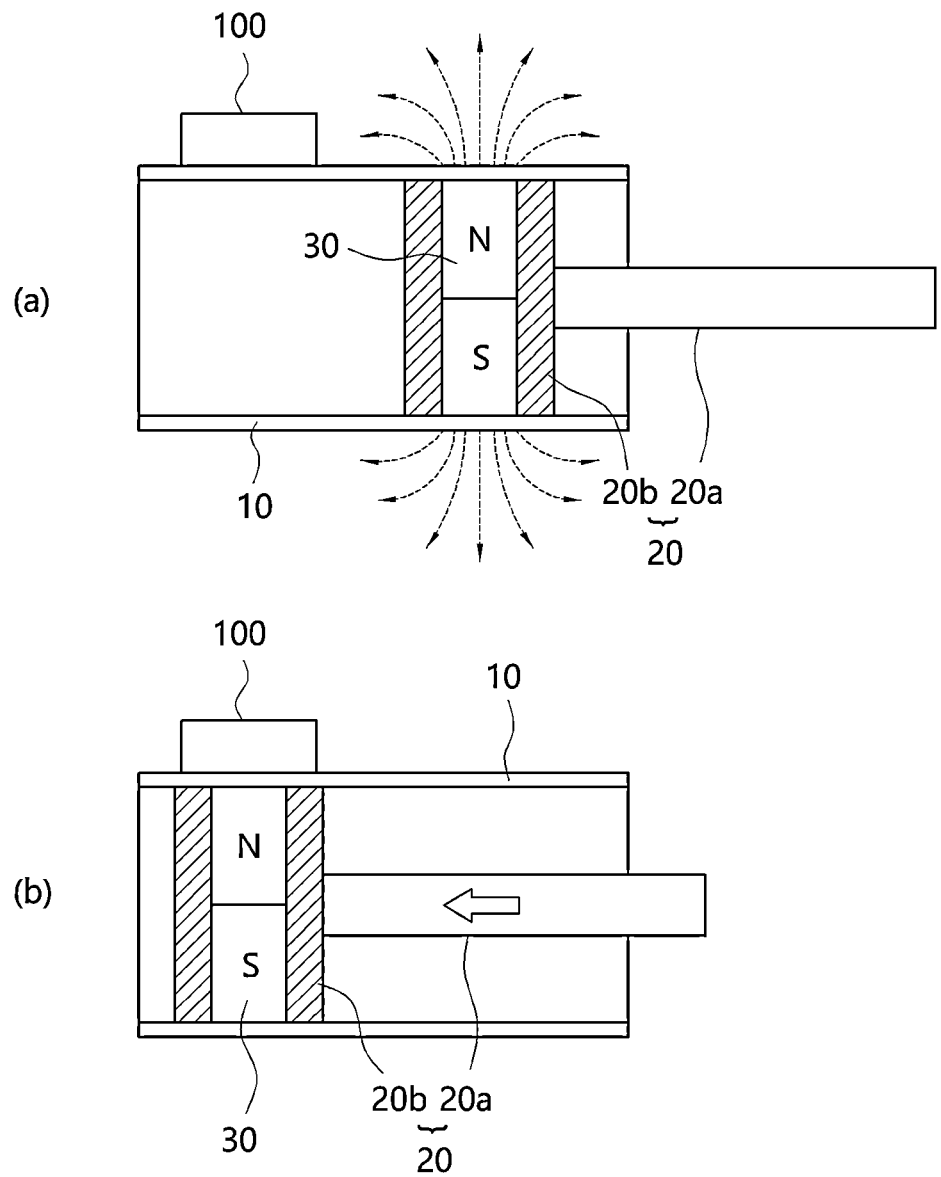
FIG. 1 is a view for describing a method of detecting, by a piston position detection device, a position of a piston according to an embodiment of the present invention.

FIG. 1 is a view for describing a method of detecting, by a piston position detection device, a position of a piston according to an embodiment of the present invention.

In FIG. 1, an actuator used in a process of machining and assembling a relatively large metal product is illustrated.

The actuator may include a cylinder 10 and a piston 20 disposed in the cylinder 10.

In this case, the cylinder 10 may be formed in a cylindrical shape but is not limited thereto. In addition, the piston 20 may move in the cylinder 10 in a longitudinal direction and includes a piston rod 20a and a piston head 20b of which one end is connected to the piston rod 20a.

The actuator includes a magnetic material 30 and a piston position detection device 100 to detect a position of the piston 20 and control an operation of the piston 20 in the cylinder 10.

In this case, the magnetic material 30 may be provided on the piston head 20b and generate a magnetic field to emit the magnetic field to the outside of the cylinder 10. In addition, the magnetic material 30 may have various magnetic polarities according to a shape or type of the cylinder 10, and a magnetic field emitted outward by the magnetic material 30 may have various magnitudes in the range of 10 mT to 60 mT.

In addition, the piston position detection device 100 may be mounted on one end or each of both ends of an outer circumferential surface of the cylinder 10 and may detect a magnetic field generated by the magnetic material 30 to detect a position of the piston 20 from the outside of the cylinder 10.

For example, as illustrated in FIG. 1, the magnetic material 30 provided in the piston 20 emits a magnetic field to the outside of the cylinder 10, and the piston position detection device 100 detects the magnetic field emitted by the magnetic material 30 to the outside (see FIG. 1A). In this case, as the piston 20 moves to be closer to a position at which the piston position detection device 100 is mounted, a magnitude of the magnetic field detected by the piston position detection device 100 increases (see FIG. 2B). As describe above, the piston position detection device 100 may detect the position of the piston 20 on the basis of the magnitude of the detected magnetic field.

Figure 2:
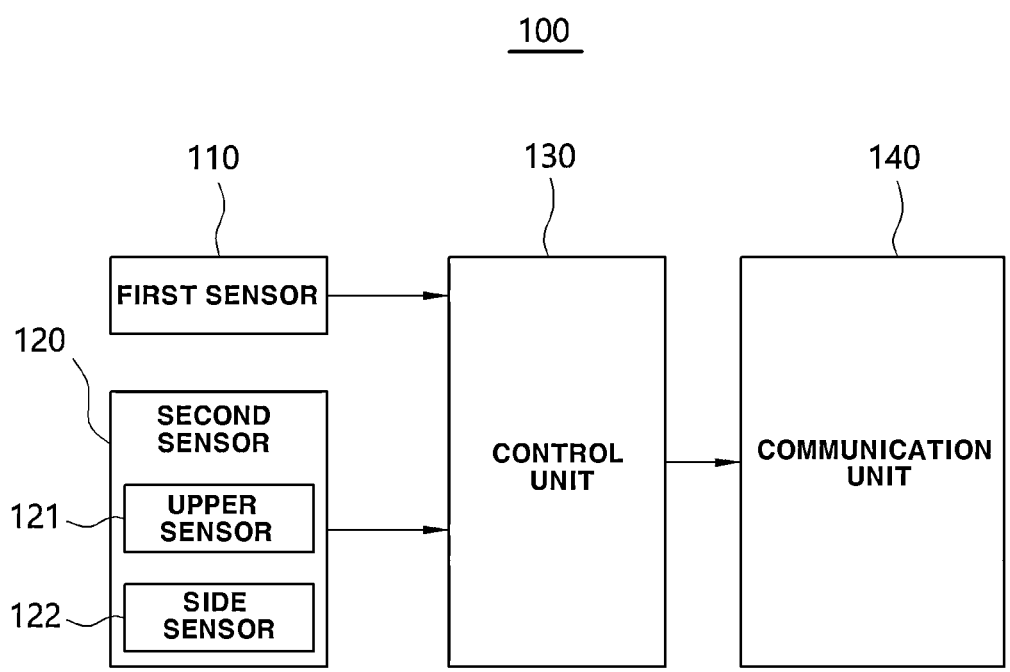
FIG. 2 is a block diagram of the piston position detection device according to the embodiment of the present invention.
Figure 3:
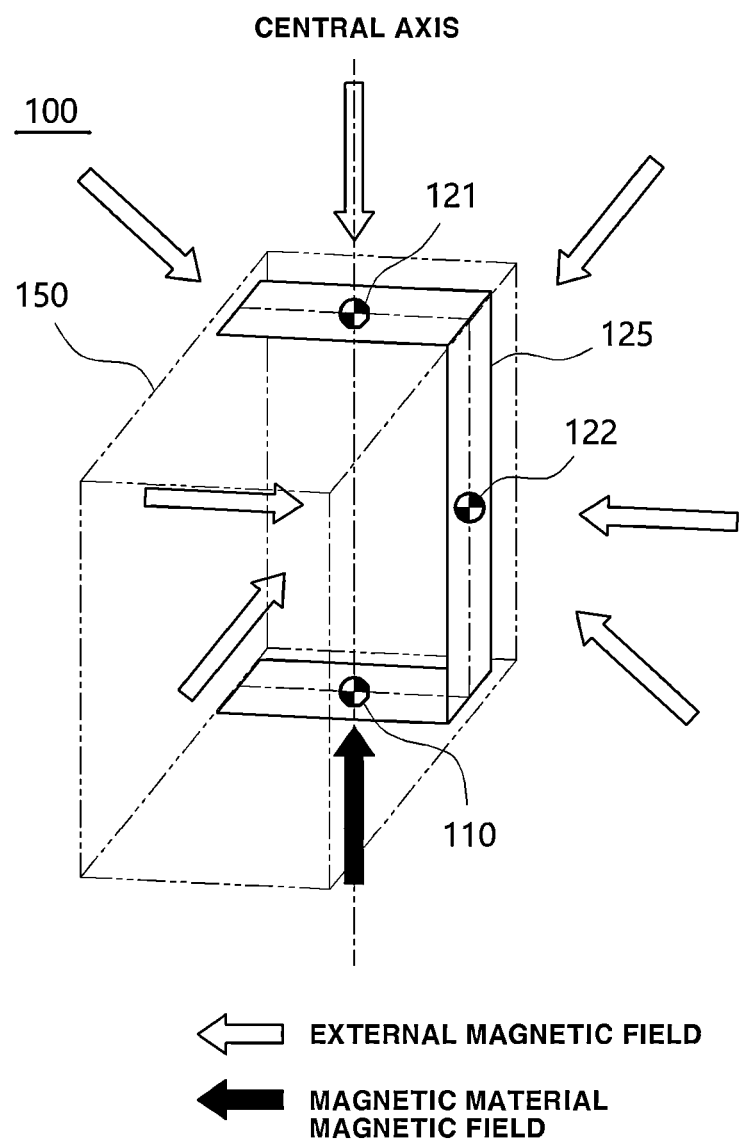
FIG. 3 is a view illustrating an internal structure of the piston position detection device according to the embodiment of the present invention.

FIG. 2 is a block diagram of the piston position detection device according to the embodiment of the present invention. FIG. 3 is a view illustrating an internal structure of the piston position detection device according to the embodiment of the present invention.

Referring to FIGS. 2 and 3, the piston position detection device 100 according to the embodiment of the present invention may include a first sensor 110, a second sensor 120, a control unit 130, and a communication unit 140. In addition, the components may be disposed and accommodated in a housing 150 formed in a box shape.

In this case, the housing 150 may be mounted on one end or both ends of the outer circumferential surface of the cylinder 10, but is not limited thereto, and may be mounted at any position at which a position detection of the piston 20 is required.

The first sensor 110 may detect a magnetic field generated by the magnetic material 30 and emitted in a direction perpendicular to the outer circumferential surface of the cylinder 10 to detect a position of the piston. In addition, the second sensor 120 may prevent a false detection of the first sensor 110 by detecting an external magnetic field formed at an upper side and left and right sides of the piston position detection device 100 before the first sensor 110 detects the external magnetic field.

In this case, the external magnetic field is an element which interferes with detecting the position of the piston 20 and may be mainly generated by an electric welding machine used in a process of machining and assembling a metal product but is not limited thereto.

Such an external magnetic field may be incident on the piston position detection device 100 in various directions such as 0° and left or right 45°, 90°, and 135° with reference to a central axis of the first sensor according to a position of the electric welding machine.

In addition, the external magnetic field is generated in the form of an impulse by a current flowing in a conductive wire when electric welding is performed, and when the first sensor 110 detects the external magnetic field, the first sensor 110 falsely detects a position of the piston 20. That is, an error that the piston 20 is detected as moved occurs even when the piston 20 did not move actually.

In order to prevent this error, the piston position detection device 100 according to the embodiment of the present invention may detect the external magnetic field using the second sensor 110 to prevent a false detection of the first sensor 110. The detailed description thereof will be given below.

The first sensor 110 and the second sensor 120 may detect a magnetic field of minimum 3 mT or more, and may be high-sensitive semiconductor Hall sensors using the Hall effect, but the present invention is not limited thereto.

Referring to FIG. 2, the first sensor 110 may be disposed on a lower surface of the housing 150 facing the outer circumferential surface of the cylinder 10. Accordingly, the first sensor 110 may detect a magnetic field generated by the magnetic material 30 before the second sensor 120 detects the magnetic field.

The second sensor 120 may include an upper sensor 121 and a lower sensor 122.

In this case, the upper sensor 121 may be disposed on an upper surface of the housing 150, and the side sensor 122 may be disposed on one side surface of the housing 150. Accordingly, the upper sensor 121 may detect an external magnetic field formed at an upper side of the housing 150 before the first sensor 110 and the side sensor 122 detect the external magnetic field, and the side sensor 122 may detect an external magnetic field formed at a left or right side of the housing 150 before the first sensor 110 and the upper sensor 121 detect the external magnetic field.

The first sensor 110, the upper sensor 121, and the side sensor 122 may be formed on one substrate 125, and the substrate 125 may be bent and disposed on an inner surface of the housing 150. In this case, the substrate 125 may be a flexible circuit board but is not limited thereto. Accordingly, the first sensor 110, the upper sensor 121, and the side sensor 122 may be positioned on the same surface (vertical surface).

The upper sensor 121 is positioned on a central axis of the first sensor 110 and is parallel to the first sensor 110, and the side sensor 122 forms an angle of 90° with the first sensor 110 and the upper sensor 121. In this case, since the upper sensor 121 is for detecting an external magnetic field, the upper sensor 121 may preferably be spaced 30 mm or more from the first sensor 110 in order to minimize malfunction due to an influence of the magnetic field of the magnetic material 30.

As describe above, in the piston position detection device 100 according to the embodiment of the present invention, since one substrate 125 may be used to arrange all the first sensor 110, the upper sensor 121, and the side sensor 122 at designated positions on the inner surface of the housing 150, the efficiency of a manufacturing process can be improved.

Meanwhile, when a length of the cylinder 10 is relatively small, the piston position detection device 100 should be small in order to detect a position of the piston 20. However, there is a problem that a manufacturing cost increases to miniaturize the piston position detection device 100.

In order to solve such a problem, the first sensor 110, the upper sensor 121, and the side sensor 122 may be disposed to be biased to one side with respect to a center of the housing 150. For example, the first sensor 110, the upper sensor 121, and the side sensor 122 may be disposed on an edge of one side of the housing 150.

Accordingly, as the housing 150 is disposed on the outer circumferential surface of the cylinder 10 so that a region in which the first sensor 110, the upper sensor 121, and the side sensor 122 are disposed is positioned at one end of the cylinder 10, when the length of the cylinder 10 is relatively small, the piston position detection device 100 can easily detect a position of the piston 20 even when the piston position detection device 100 is not miniaturized.

Figure 4:
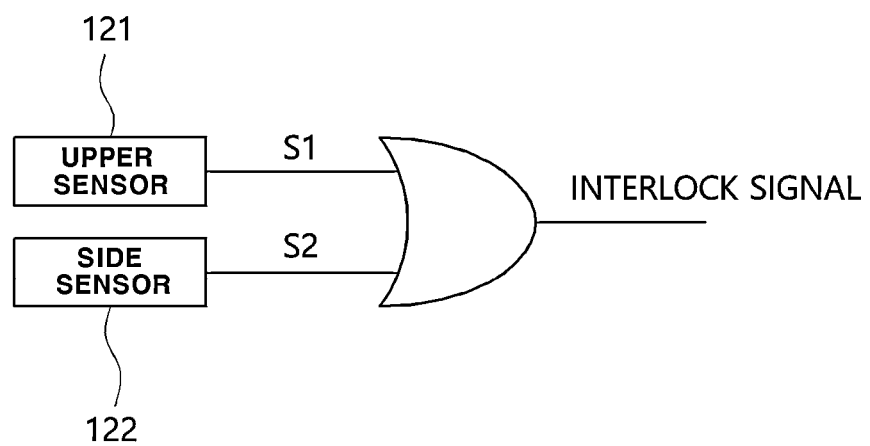
FIG. 4 is a conceptual view of an operation in which a control unit avoids a false detection of a piston position according to the embodiment of the present invention.

FIG. 4 is a conceptual view of an operation in which the control unit avoids a false detection of a piston position according to the embodiment of the present invention.

When at least one of the upper sensor 121 and the side sensor 122 detects an external magnetic field, the control unit 130 may ignore a sensing signal of the first sensor 110 generated by reacting to the external magnetic field.

Specifically, referring to FIGS. 3 and 4, the first sensor 110 may detect a magnetic field of the magnetic material 30 generated at a lower side of the housing 150 due to a positional advantage of the sensor before the upper sensor 121 and the side sensor 122 detect the magnetic field. That is, the first sensor 110, the side sensor 122, and the upper sensor 121 sequentially detect the magnetic field with time differences in several milliseconds.

When the first sensor 110 detects the magnetic field of the magnetic material 30, and a detected sensing value is greater than or equal to a first reference value, the first sensor 110 may generate a first sensing signal and transmit the first sensing signal to the control unit 130. Accordingly, the control unit 130 may detect a position of the piston 20 on the basis of the first sensing signal.

Meanwhile, the first sensor 110 may also generate a first sensing signal by reacting to an external magnetic field. That is, when a detected sensing value of the external magnetic field is greater than or equal to the first reference value, the first sensing signal may be generated and transmitted to the control unit 130.

An external magnetic field formed at an upper side of the housing 150 may be detected by the upper sensor 121 due to a positional advantage of the sensor before detected by the first sensor 110 and the side sensor 122. That is, the upper sensor 121, the side sensor 122, and the first sensor 110 sequentially detect the external magnetic field with time differences in several milliseconds.

When the upper sensor 121 detects the external magnetic field, and a detected sensing value is greater than or equal to a second reference value, the upper sensor 121 may generate a second sensing signal S1 and transmit the second sensing signal S1 to the control unit 130.

An external magnetic field generated at a left or right side of the housing 150 may be detected by the side sensor 122 due to a positional advantage of the sensor before detected by the first sensor 110 and the upper sensor 121. That is, the side sensor 122, the upper sensor 121, and the first sensor 110 detect the external magnetic field with time differences in several milliseconds. However, there may be no time difference between the first sensor 110 and the upper sensor 121 that detect the magnetic field at some incident angles of the magnetic field.

When the side sensor 122 detects the external magnetic field, and a detected sensing value is greater than or equal to a third reference value, the side sensor 122 may generate a third sensing signal S2 and transmit the third sensing signal S2 to the control unit 130.

When at least one of the upper sensor 121 and the side sensor 122 detects the external magnetic field before the first sensor 110 detects the external magnetic field, the control unit 130 may ignore the first sensing signal of the first sensor 110 generated by reacting to the external magnetic field. That is, when the control unit 130 receives the first to third sensing signals and at least one of the second and the third sensing signals S1 and S2 is received before the first sensing signal is received, the control unit 130 may generate an interlock signal INTERLOCK SIGNAL to perform control so that the first sensing signal is ignored.

Meanwhile, when input time differences between the second and third sensing signals S1 and S2 and the first sensing signal are so large, the first sensing signal may be a signal generated by reacting to a magnetic field of the magnetic material 30 rather than the external magnetic field.

Accordingly, after at least one of the upper sensor 121 and the side sensor 122 detects the external magnetic field, when the control unit 130 receives the first sensing signal of the first sensor 110 within a reference time, the control unit 130 may ignore the first sensing signal. That is, after the control unit 130 receives at least one of the second and third sensing signals S1 and S2, and when the control unit 130 receives only the first sensing signal within the reference time, the control unit 130 may determine that the first sensing signal is a signal due to the external magnetic field and may ignore the first sensing signal.

The communication unit 140 may wirelessly transmit a position of the piston 20 detected by the first sensor 110 to a programmable logic controller (PLC).

Accordingly, since a cable can be omitted unlike the conventional wired transmission method, a process machine can be simplified to easily handle a problem of the machine, and a risk of fire can be reduced.

In addition, since the piston position detection device 100 according to the embodiment of the present invention can avoid a false detection due to an external magnetic field through an algorithm (software) method instead of a physical structure change, unlike a method of blocking an external magnetic field, a blocking layer can be omitted, and thus the piston position detection device 100 can be miniaturized to improve a degree of design freedom, and a manufacturing cost can be reduced.

In addition, in the piston position detection device 100 according to the embodiment of the present invention, since the blocking layer can be omitted unlike the conventional method of blocking an external magnetic field, the piston position detection device 100 can wirelessly transmit a position of the piston.

Meanwhile, although not illustrated in the drawings, the piston position detection device 100 according to the embodiment of the present invention may further include a battery for supplying power to the first sensor 110, the second sensor 120, the control unit 130, and the communication unit 140. In this case, the battery may be accommodated in the housing 150.

While some embodiments of the present invention have been described above, the spirit of the present invention is not limited to the embodiments proposed in this specification, and other embodiments may be easily suggested by adding, changing, and removing components within the scope of the invention by those skilled in the art and will fall within the spiritual range of the present invention.

INDUSTRIAL APPLICABILITY

A piston position detection device according to the present invention can be applied to a process of machining and assembling metal products in the automobile industry or the like.

The invention claimed is:

1. A piston position detection device which detects a position of a piston, which includes a magnetic material and is disposed to move in a cylinder, the piston position detection device comprising:
   a first sensor which detects a magnetic field generated by the magnetic material to detect the position of the piston;
   a second sensor which detects an external magnetic field to prevent a false detection of the first sensor before the first sensor detects the external magnetic field;
   a housing which is mounted on an outer circumferential surface of the cylinder and accommodates the first sensor and the second sensor therein; and
   a controller configured to ignore a sensing signal of the first sensor generated by reacting to the external magnetic field when the second sensor detects the external magnetic field before the first sensor detects the external magnetic field,
   wherein, when the second sensor detects the external magnetic field, and the sensing signal of the first sensor is input to the controller within a reference time, the controller ignores the sensing signal.

2. The piston position detection device of claim 1, wherein the second sensor includes:
   an upper sensor which detects the external magnetic field formed at an upper side of the housing before the first sensor detects the external magnetic field; and
   a side sensor which detects the external magnetic field formed at a left or right side of the housing before the first sensor detects the external magnetic field.

3. The piston position detection device of claim 2, wherein the first sensor is disposed on a lower surface of the housing facing the outer circumferential surface of the cylinder.

4. The piston position detection device of claim 3, wherein the upper sensor is disposed on an upper surface of the housing.

5. The piston position detection device of claim 3, wherein the side sensor is disposed on one side surface of the housing.

6. The piston position detection device of claim 2, wherein the first sensor and the second sensor are positioned on the same surface.

7. The piston position detection device of claim 2, wherein:
   the first sensor and the second sensor are formed on one substrate; and
   the substrate is bent and disposed on an inner surface of the housing.

8. The piston position detection device of claim 2, wherein the first sensor and the second sensor are disposed to be biased to one side of the housing with reference to a center of the housing.

9. The piston position detection device of claim 2, wherein the controller wirelessly transmits the position of the piston detected by the first sensor.

10. The piston position detection device of claim 2, further comprising a battery which supplies power to the first sensor and the second sensor.

* * * * *